(12) United States Patent
Matte et al.

(10) Patent No.: US 6,571,821 B2
(45) Date of Patent: Jun. 3, 2003

(54) ENERGY CONSERVING GATE VALVE

(75) Inventors: Stephen R. Matte, Norfolk, MA (US); William G. Foley, North Andover, MA (US)

(73) Assignee: Varian, Inc., Palo Alto, CA (US)

( * ) Notice: Subject to any disclaimer, the term of this patent is extended or adjusted under 35 U.S.C. 154(b) by 29 days.

(21) Appl. No.: 09/908,435

(22) Filed: Jul. 18, 2001

(65) Prior Publication Data

US 2003/0010383 A1 Jan. 16, 2003

Related U.S. Application Data

(60) Provisional application No. 60/305,051, filed on Jul. 13, 2001.

(51) Int. Cl.[7] .................................. F16L 58/04
(52) U.S. Cl. ........................ 137/375; 118/733
(58) Field of Search ................. 137/375; 118/733

(56) References Cited

U.S. PATENT DOCUMENTS

| 3,773,068 A | * | 11/1973 | Vietorisz | 137/340 |
| 4,722,365 A | * | 2/1988 | Hockaday | 137/828 |
| 5,901,558 A | | 5/1999 | Matte et al. | |
| 5,942,038 A | * | 8/1999 | Mayeda et al. | 118/719 |
| 6,007,634 A | * | 12/1999 | Weber et al. | 118/725 |

FOREIGN PATENT DOCUMENTS

DE      27 26 066 A1      12/1978

* cited by examiner

Primary Examiner—John Fox
(74) Attorney, Agent, or Firm—William R. McClellan; Bella Fishman

(57) ABSTRACT

A valve includes a valve housing having a fluid conduit communicating between an inlet port and an outlet port, a valve closure member that is movable between a closed position and an open position, and a radiation-absorbing coating on at least a part of the fluid conduit. The radiation-absorbing coating may be disposed on inside surfaces of mounting flanges of the valve. The coating may be black chrome or a black anodized surface, for example.

20 Claims, 1 Drawing Sheet

ENERGY CONSERVING GATE VALVE

CROSS REFERENCE TO RELATED APPLICATION

This application claims the benefit of provisional application Serial No. 60/305,051, filed Jul. 13, 2001, which is hereby incorporated by reference.

FIELD OF THE INVENTION

This invention relates to valves that are used in process equipment which operates at elevated temperatures and, more particularly, to valves that have a radiation-absorbing coating on at least a part of the fluid conduit.

BACKGROUND OF THE INVENTION

Conventional gate valve structures include a valve housing having a fluid conduit and a valve seat, a seal plate that is movable between an open position and a closed position in the fluid conduit, and an actuator mechanism for moving the seal plate between the open and closed positions. The seal plate engages the valve seat and seals the fluid conduit in the closed position. The seal plate may be moved from the closed position to a retracted position and then moved linearly to the open position. The valve may also be operated with the seal plate in a partially open position. The valve housing may include mounting flanges for connecting the valve to other system components.

Gate valves are used in a variety of applications. Different applications may involve liquids, gases and vacuum. Some applications involve the control of gases at elevated temperatures. An example of such an application is in equipment for processing semiconductor wafers, such as etching and chemical vapor deposition (CVD) systems. In some applications of this type, the valve is heated by an external source to minimize process gas deposition in the valve. In prior art systems, the valve is heated with a heater blanket to maintain a set point temperature, such as 80° C.

In other applications, a high vacuum pump is mounted on the downstream port of the gate valve. The high vacuum pump may be a cryogenic vacuum pump which may typically operate at 110 Kelvin or lower. When the cryogenic vacuum pump is used to pump a process gas having an elevated temperature, a substantial heat load is placed on the cryogenic refrigerator.

In such applications, it is desirable to limit energy waste so as to limit operating costs. In addition, some countries have mandated energy conservation in such processing systems. Accordingly, there is a need for valve structures and manufacturing methods which achieve energy conservation.

SUMMARY OF THE INVENTION

According to a first aspect of the invention, a valve comprises a valve housing having a fluid conduit communicating between an inlet port and an outlet port, a valve closure member that is movable between a closed position which blocks the fluid conduit and an open position retracted from the fluid conduit, and a radiation-absorbing coating on at least a part of the fluid conduit in the valve housing.

In one embodiment, the valve housing includes mounting flanges and the radiation-absorbing coating is disposed on inside surfaces of the mounting flanges. The coating may be black chrome or a black anodized surface, for example. The coating is selected to absorb thermal radiation.

According to another aspect of the invention, a method is provided for making a valve. The method comprises the steps of fabricating a valve having a fluid conduit for carrying a fluid between an inlet port and an outlet port when the valve is open, and forming a radiation-absorbing coating on at least a part of the fluid conduit.

BRIEF DESCRIPTION OF THE DRAWINGS

For better understanding of the present invention, reference is made to the accompanying drawings, which are incorporated herein by reference in and which.

DETAILED DESCRIPTION

Figure 1:
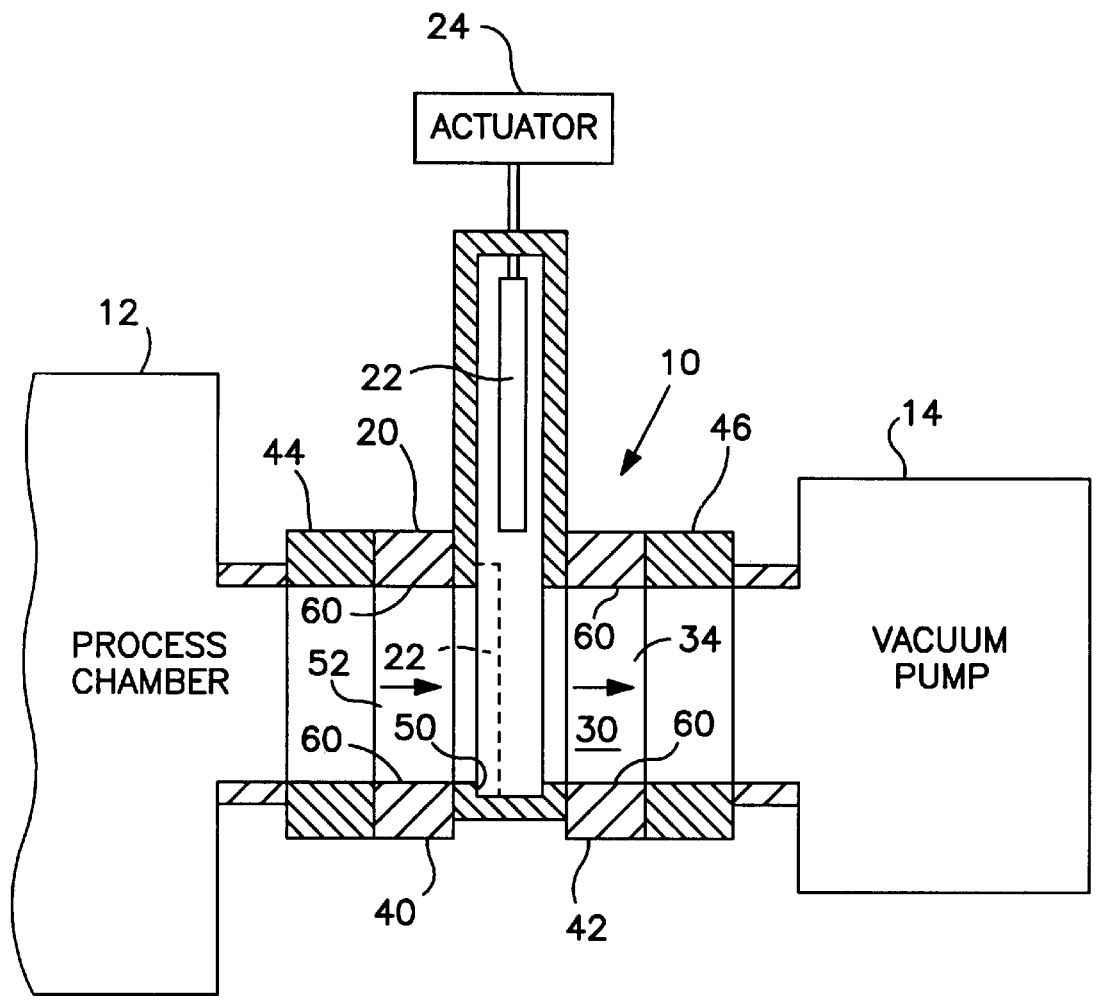
FIG. 1 is a block diagram of a processing system incorporating a gate valve in accordance with an embodiment of the invention.

A highly simplified schematic block diagram of a process system incorporating a gate valve in accordance with an embodiment of the invention is shown in FIG. 1. A gate valve 10 is connected vacuum tight between a process chamber 12 and vacuum pump 14. The process chamber 12 may be an enclosed chamber for processing of workpieces, such as semiconductor wafers or continuous substrates, in a controlled environment. Typically, the process chamber 12 is required to operate with a specified process gas in a specified pressure range. The process chamber 12 may operate at an elevated temperature. By way of example only, the process chamber 12 may be a chemical vapor deposition chamber or an etching chamber. Vacuum pump 14 may be used to control the process environment in process chamber 12 and, in particular, to control the pressure of the process gas in process chamber 12. By way of example, vacuum pump 14 may be a cryogenic vacuum pump or a turbomolecular vacuum pump. Gate valve 10 controllably connects process chamber 12 to vacuum pump 14.

Gate valve 10 includes a valve housing 20, a seal plate 22 and an actuator 24. Valve housing 20 includes a fluid conduit 30 that communicates between an inlet port 32 and an outlet port 34 when the valve is open. Valve housing 20 further includes an inlet mounting flange 40 and an outlet mounting flange 42 for connecting gate valve 10 to the components of the processing system. In the example of FIG. 1, inlet flange 40 is connected to a mounting flange 44 of process chamber 12, and outlet flange 42 is connected to a mounting flange 46 of vacuum pump 14. As known in the art, each mounting flange may includes a plurality of holes for bolts or other fasteners and a circular groove for an elastomer sealing ring or other sealing device. Valve housing 20 further includes a valve seat 50 for engaging seal plate 22 in the closed position.

Seal plate 22 is movable by actuator 24 between a closed position, shown in phantom in FIG. 1, and an open position, shown by solid lines in FIG. 1. In the closed position, seal plate 22 engages valve seat 50 and blocks fluid flow through fluid conduit 30. In the open position, seal plate 22 is retracted from fluid conduit 30, thereby permitting fluid flow through fluid conduit 30. The construction and operation of gate valves is, in general, well known to those skilled in the art.

In operation, a process gas, such as argon for example, flows from process chamber 12 through fluid conduit 30 to vacuum pump 14 when seal plate 22 is in the open position. The process gas may have an elevated temperature, such as for example, 500° C. The heated process gas may have an adverse impact on vacuum pump 14 or another component that is downstream of gate valve 10. For example, where vacuum pump 14 is a cryogenic vacuum pump that typically operates at 110 Kelvin or lower, the heated process gas places a substantial heat load on the refrigerator of the cryogenic vacuum pump. Furthermore, in some applications, gate valve 10 may require operation at a temperature set point, such as 80° C., to limit deposition of the process gas in the gate valve. In prior art systems, the gate valve has been heated by a blanket heater to maintain the set point.

In accordance with an aspect of the invention, some or all of the surfaces of fluid conduit 30 have a radiation-absorbing coating or layer to enhance absorption of thermal radiation from the heated process gas. Referring again to FIG. 1, a radiation-absorbing coating or layer 60 may be applied to the inside surfaces of inlet flange 40 and outlet flange 42. By contrast, prior art valves typically had a shiny inside surface which reflected rather than absorbed thermal radiation. The effect of the radiation-absorbing coating or layer is to reduce the temperature of the process gas at outlet port 34 and to increase the temperature of valve housing 20. Thus, the heat load on the downstream component is reduced. As a result, a smaller cryogenic refrigerator or a lower cooling water flow rate may be utilized. Furthermore, in cases where the valve is required to operate at an elevated temperature to inhibit deposition of the process gas, less energy is required to maintain the required temperature. In general, all or part of the inside surface of the fluid conduit 30 may have the radiation-absorbing coating or layer. The radiation-absorbing coating is most effective on those surfaces which would otherwise be reflective of thermal energy.

The radiation-absorbing coating is selected to absorb thermal radiation from the process gas. In general, black coatings with rough surfaces are most effective in absorbing thermal radiation. In addition, the radiation-absorbing coating should be durable for long operating life and should be characterized by low outgassing during operation. Suitable radiation-absorbing coatings include, but are not limited to, black chrome and black anodized surfaces. The coating typically has a thickness in a range of about 0.001 to 0.005 inch, but is not limited to this thickness range. The radiation-absorbing coating may be applied to the desired parts of the fluid conduit by electroless or electrodeposited plating.

By utilizing radiation-absorbing coatings on mounting flanges of gate valves, radiation absorption can be increased from about 5% with shiny surfaces to about 95% with radiation-absorbing coatings. The overall absorptivity of the valve can be increased by about 40% in comparison with prior art designs.

It will be understood that the use of radiation-absorbing coatings is not limited to gate valves, but can be utilized on the fluid conduit of any valve that is required to transport gases at elevated temperatures. Examples, include block valves and butterfly valves. The radiation-absorbing coating can be applied to all or a part of the fluid conduit to enhance the absorption of thermal energy from the gas flowing through the valve.

Having described this invention in detail, those skilled in the art will appreciate that numerous modifications may be made of this invention without departing from its spirit. Therefore, it is not intended that the breadth of the invention be limited to the specific embodiment illustrated and described. Rather, the breadth of the invention should be determined by the appended claims and their equivalents.

What is claimed is:

1. A valve comprising:
   a valve housing having a fluid conduit communicating between an inlet port and an outlet port;
   a valve closure member that is movable between a closed position which blocks the fluid conduit and an open position which permits fluid flow through the fluid conduit; and
   a radiation-absorbing coating on at least a part of the fluid conduit in said valve housing.

2. A valve as defined in claim 1 wherein said valve housing includes mounting flanges for attachment to other system components and wherein said radiation-absorbing coating is disposed on inside surfaces of said mounting flanges.

3. A valve as defined in claim 1 wherein said radiation-absorbing coating comprises black chrome.

4. A valve as defined in claim 1 wherein said radiation-absorbing coating comprises a black anodized surface.

5. A valve as defined in claim 1 wherein said radiation-absorbing coating comprises a black coating.

6. A valve as defined in claim 1 wherein said radiation-absorbing coating has a thickness in a range of about 0.001 to 0.005 inch.

7. A valve as defined in claim 1 wherein said radiation-absorbing coating is selected to absorb thermal radiation.

8. A valve as defined in claim 1 wherein said radiation-absorbing coating comprises a high absorptivity coating.

9. A valve as defined in claim 1 wherein said valve comprises a gate valve and wherein said valve closure member comprises a seal plate.

10. A method for making a valve, comprising the steps of:
    fabricating a valve having a fluid conduit for carrying a fluid between an inlet port and an outlet port when the valve is open; and
    forming a radiation-absorbing coating on at least a part of the fluid conduit.

11. A method as defined in claim 10 where the step of fabricating a valve includes fabricating mounting flanges on the valve housing and wherein the step of forming a radiation-absorbing coating comprises coating inside surfaces of the mounting flanges with the radiation-absorbing coating.

12. A method as defined in claim 10 wherein the step of forming a radiation-absorbing coating comprises coating at least a part of the fluid conduit with black chrome.

13. A method as defined in claim 10 where the step of forming a radiation-absorbing coating comprises by forming a black anodized surface.

14. A method as defined in claim 10 where the step of forming a radiation-absorbing coating comprises coating at least a part of the fluid conduit with a radiation-absorbing coating having a thickness in a range of 0.001 to 0.005 inch.

15. A gate valve comprising:
    a valve housing having a fluid conduit communicating between an inlet port and an outlet port, said valve housing having an inlet flange and an outlet flange;
    a seal plate that is movable between a closed position which blocks said fluid conduit and an open position retracted from said fluid conduit; and
    a radiation-absorbing coating on the inside surfaces of said inlet flange and said outlet flange.

16. A gate valve as defined in claim 15 wherein said radiation-absorbing coating comprises black chrome.

17. A gate valve as defined in claim 15 wherein said radiation-absorbing coating comprises a black anodized surface.

18. A gate valve as defined in claim 15 wherein said radiation-absorbing coating comprises a black coating.

19. A gate valve as defined in claim 15 wherein said radiation-absorbing coating has a thickness in a range of about 0.001–0.005 inch.

20. A gate valve as defined in claim 15 wherein said radiation-absorbing coating is selected for high absorption of thermal radiation.

* * * * *